United States Patent [19]

Iwata

[11] Patent Number: 5,933,425
[45] Date of Patent: Aug. 3, 1999

[54] SOURCE ROUTING FOR CONNECTION-ORIENTED NETWORK WITH REPEATED CALL ATTEMPTS FOR SATISFYING USER-SPECIFIED QOS PARAMETERS

[75] Inventor: Atsushi Iwata, Tokyo, Japan

[73] Assignee: NEC Corporation, Japan

[21] Appl. No.: 08/759,159

[22] Filed: Dec. 3, 1996

[30]     Foreign Application Priority Data

Dec. 4, 1995 [JP] Japan ................................... 7-315558

[51] Int. Cl.$^6$ ................................................. H04L 12/28
[52] U.S. Cl. ......................... 370/351; 370/238; 370/252; 370/395
[58] Field of Search .................................. 370/229, 230, 370/232, 234, 238, 237, 252, 251, 395, 389, 225, 227, 216, 400, 353, 379, 382, 401, 397, 399, 409; 340/827, 825.5

[56]          References Cited

U.S. PATENT DOCUMENTS

5,042,027  8/1991  Takase et al. ............................ 370/351
5,115,429  5/1992  Hluchyj et al. .......................... 370/232
5,210,740  5/1993  Anzai et al. ............................. 370/251
5,649,108  7/1997  Spiegel et al. .......................... 370/400

Primary Examiner—Dang Ton
Assistant Examiner—Phirin Sam
Attorney, Agent, or Firm—Ostrolenk, Faber, Gerb & Soffen, LLP

[57]          ABSTRACT

In a connection-oriented network where ATM nodes are interconnected by links, periodically updated link status information of the network is stored in a database to indicate resource constraints of the network links. Responsive to a connection request specifying multiple QOS parameters, a first path to a destination is selected and a first signaling message is transmitted containing routing data of the first path toward the destination if resource constraints of the first path satisfy all the specified QOS parameters. If the transmission of the first signaling message is unsuccessful or the resource constraints of the first path do not satisfy all the specified QOS parameters, then a second path to the destination is selected according to contents of the database that correspond to one of the specified QOS parameters, and a second signaling message containing routing data of the second path is transmitted toward the destination.

16 Claims, 10 Drawing Sheets

| LINK | AVAILABLE CELL RATE | ADMINISTRATIVE WEIGHT | 103 |
|------|---------------------|----------------------|-----|
| A-B  | 25 Mbps             | 3                    |     |
| A-C  | 50 Mbps             | 5                    |     |
| C-D  | 25 Mbps             | 5                    |     |
| C-E  | 5 Mbps              | 5                    |     |
| B-E  | 10 Mbps             | 10                   |     |
| D-E  | 25 Mbps             | 10                   |     |

LINK STATE DATABASE

FIG. 4B

PRECALCULATED PATH / PREASSIGNED PATH TABLE

FIG. 4C

ON-DEMAND CALCULATED PATH / DEMAND-ASSIGNED PATH TABLE

LINK STATE DATABASE 103

| LINK | AVAILABLE CELL RATE | CELL TRANSFER DELAY | ADMINISTRATIVE WEIGHT |
|---|---|---|---|
| A-B | 25 Mbps | 10 milliseconds | 3 |
| A-C | 50 Mbps | 10 milliseconds | 5 |
| C-D | 25 Mbps | 10 milliseconds | 5 |
| C-E | 25 Mbps | 10 milliseconds | 15 |
| B-E | 10 Mbps | 10 milliseconds | 5 |
| D-E | 25 Mbps | 10 milliseconds | 5 |

LINK STATE DATABASE 103

| LINK | AVAILABLE CELL RATE | CELL TRANSFER DELAY | ADMINISTRATIVE WEIGHT |
|---|---|---|---|
| A-B | 25 Mbps | 10 milliseconds | 3 |
| A-C | 50 Mbps | 10 milliseconds | 5 |
| C-D | 25 Mbps | 10 milliseconds | 5 |
| C-E | 25 Mbps | 10 milliseconds | 15 |
| B-E | 10 Mbps | 10 milliseconds | 5 |
| D-E | 25 Mbps | 10 milliseconds | 5 |

LINK STATE DATABASE 103

| LINK | AVAILABLE CELL RATE | CELL TRANSFER DELAY | ADMINISTRATIVE WEIGHT |
|------|---------------------|---------------------|----------------------|
| A-B  | 25 Mbps             | 10 milliseconds     | 3                    |
| A-C  | 50 Mbps             | 10 milliseconds     | 5                    |
| C-D  | 25 Mbps             | 10 milliseconds     | 5                    |
| C-E  | 25 Mbps             | 10 milliseconds     | 15                   |
| B-E  | 10 Mbps             | 10 milliseconds     | 5                    |
| D-E  | 25 Mbps             | 10 milliseconds     | 5                    |

FIG. 10B

DEMAND-ASSIGNED PATH TABLE 106

| DEST. NODE | PATH  |
|------------|-------|
| B          | A-B   |
| C          | A-C   |
| D          | A-C-D |
| E          | A-C-E |

SOURCE ROUTING FOR CONNECTION-ORIENTED NETWORK WITH REPEATED CALL ATTEMPTS FOR SATISFYING USER-SPECIFIED QOS PARAMETERS

BACKGROUND OF THE INVENTION

1. Field of the Invention

The present invention relates generally to asynchronous transfer mode (ATM) communications networks, and more specifically to a source routing technique using quality-of-service parameters as a determining factor for establishing a connection through ATM network nodes.

2. Description of the Related Art

A number of proposals have hitherto been made for dealing with the problem of source routing in a connection-oriented network such as ATM network An optimum path is selected from a number of possible paths by checking a user-specified quality-of-service (QOS) parameter against resource constraints of the links of each possible path. The QOS parameters are resource constraints such as transmission delay time, delay time variation, transmission error rate and cell loss rate. In response to a connection request from a user terminal, each node of the network makes a search through possible paths stored in a topology database and selects an optimum path that satisfies one of QOS parameters specified by the connection request. Known source routing algorithms involve a significant amount of on-demand computations to check to see if all of the user-specified QOS constraints are satisfied by the links of all possible paths. This will result in a long call establishment delay.

The topology database is updated at periodic intervals to adapt to changing conditions of the network. However, since the database does not precisely represent the network conditions on a real-time basis, the call establishment delay will produce instances where calls encounter discrepancies between what is expected at the source and what is actually available in the intended path, resulting in unsuccessful call attemps.

SUMMARY OF THE INVENTION

It is therefore an object of the present invention to provide a routing apparatus and method for satisfying multiple user-specified QOS constraints with a short connection establishment delay.

According to a first aspect, the present invention provides a routing apparatus for a connection-oriented network comprising a plurality of nodes interconnected by communication links. The routing apparatus comprises a database for storing periodically updated link status information of the network indicating resource constraints of the links. Control means is responsive to a connection request specifying a plurality of QOS parameters for performing the functions of (a) selecting a first path to a destination, (b) transmitting a first signaling message containing routing data of the first path toward the destination if resource constraints of the first path satisfy all the specified QOS parameters, (c) selecting a second path to the destination according to contents of the database corresponding to one of the specified QOS parameters if the transmission of the first signaling message is unsuccessful or the resource constraints of the first path do not satisfy all the specified QOS parameters, and (d) transmitting a second signaling message containing routing data of the second path toward the destination.

According to a second aspect, the present invention provides a method for routing a call through a connection-oriented network comprising a plurality of nodes interconnected by communication links. The method comprises (a) storing link status information of the network and periodically updating the stored information according to link status the network, the link status information indicating resource constraints the links, (b) selecting a first path to a destination in response to a connection request specifying a plurality of QOS parameters, (c) transmitting a first signaling message toward the destination containing routing data of the first path if resource constraints of the first path satisfy all the specified QOS parameters, (d) selecting a second path to the destination according to contents of the database corresponding to one of the specified QOS parameters if the resource constraints of the first path do not satisfy all the specified QOS parameters or the transmission of the first signaling message is unsuccessful, and (e) transmitting a second signaling message toward the destination containing routing data of the second path.

According to a third aspect, the present invention provides a method for routing a call through a connection-oriented network comprising a plurality of nodes interconnected by communication links. The method comprises the steps of (a) storing link status information of the network and periodically updating the stored information according to link status of the network, the link status information indicating resource constraints of the links, (b) resetting a count value in response to a connection request specifying a plurality of QOS parameters, (c) selecting a path to a destination according to the count value, one of the specified QOS parameters and contents of the database corresponding to the QOS parameter, (d) transmitting a signaling message containing routing data of the path toward the destination if resource constraints of the path satisfy all the specified QOS parameters, (e) incrementing the count value if the resource constraints of the path do not satisfy all the QOS parameters or if the transmission of the signaling message is unsuccessful, and (f) repeating steps (c) to (e) a predetermined number of times.

BRIEF DESCRIPTION OF THE DRAWINGS

The present invention will be described in further detail with reference to the accompanying drawings, in which.

DETAILED DESCRIPTION

Figure 1:
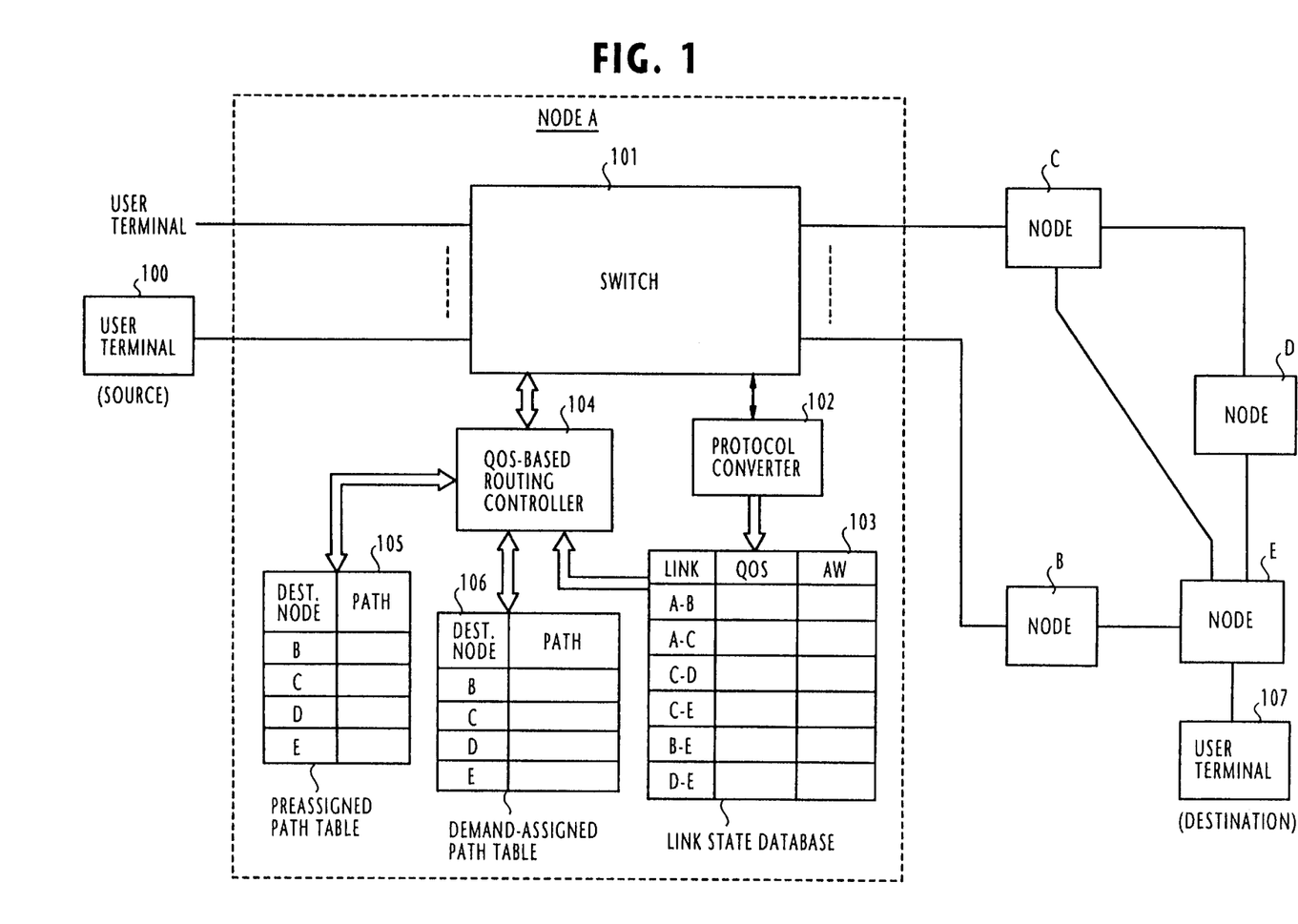
FIG. 1 is a block diagram of an ATM network according to the present invention.

In FIG. 1, there is shown a connection-oriented, or specifically ATM (asynchronous transfer mode) communications network in which a plurality of nodes A, B, C, D and E are interconnected by communication links. User terminals 100 and 107 are shown connected to nodes A and E, respectively.

Node A includes an ATM switch 101, a protocol converter 102 which exchanges link-status signaling messages via ATM switch 101 with other network nodes and maps, in a link state database 103, relationships between link identifiers of all the network links and their resource constraints represented by quality-of-service (QOS) parameter values and administrative weights (AW). The QOS parameters include resource constraints such as available cell rate (ACR), cell transfer delay (CTD), cell delay variation (CDV) and cell loss ratio (CLR). These QOS parameters are used as a link cost for selecting an optimum path between a source and a destination. The administrative weight is a parameter value that is assigned by network provider to each link of the network The administrative weight is used as a link cost to calculate the total cost of a path. At intervals, the contents of the database 103 are updated to adapt to existing network conditions.

A QOS-based routing controller 104 is associated with the link state database 103 to perform precalculation of link costs, finds optimum paths from node A to other network nodes that give a minimum sum of link costs and establishes relationships between the node identifiers of the other nodes and their optimum paths from node A to these nodes. These relationships are stored in a preassigned path table 105 as optimum topology data. The data stored in the path table 105 are updated whenever the contents of link state database 103 are updated. The preassigned path table 105 is used by routing controller 104 to establish a connection to a desired destination when a connection request is received via switch 101 from user terminal 100. A demand-assigned path table 106 is also provided. This demand-assigned path table is created by routing controller 104 whenever a need arises during a connection establishment phase by storing determined optimum path topology data.

The user's connection request contains a destination address and a QOS parameter value. As will be described, when a connection request is received from user terminal 100 indicating that user terminal 107 is the destination, node A reads the destination address and the QOS value from the received connection request and selects an optimum path to the destination terminal 107 that satisfies the specified QOS value and acts as a source node by transmitting a setup (signaling) message to an adjacent node. The setup message contains the routing information of the optimum path stored in one of the tables 105 and 106. This routing information is used successively by intermediate nodes along the path to the destination node E for extending links. As a result of the source routing, all the downstream nodes are relieved of the burden of making complex path finding calculations.

If a number of QOS parameters are specified by the connection request, the optimum path does not satisfy all of the requested QOS values since the attempt to satisfy multiple QOS values would be an insolvable NP-complete problem. Therefore, the path finding operation is one that is not intended to simultaneously satisfy all the requested QOS values. In one or more variations of the present invention, the administrative weight is used as a QOS parameter to calculate a sum of link costs for each of possible paths to destination in order to find an optimum path which gives a minimum value of the sums. Since the optimum path chosen in this way does not necessarily meet one or more requested QOS values which are not used in the link cost calculation, the routing controller 104 selects an optimum path as a candidate using a requested QOS parameter and determines whether it meets all the other requested QOS values, and makes a decision on a suboptimum path that is a compromise between requested QOS values.

However, since the contents of link state database 103 do not precisely follow the QOS parameter values of the network on a real time basis, call attempts may fail if there is a link in a chosen path that does not actually meet the requested QOS value. In this case, a link-status signaling message is sent from the node where the call is stranded to the source node, indicating the identification of the link and the up-to-date QOS value of the link. On receiving the signaling message, the source node excludes the link that does not meet the requested QOS value from a list of candidates to be selected next and selects an optimum path from the list for the next attempt. The call routing which is repeated upon encountering a failure at an intermediate point of a path is known as the "crankback" routing scheme.

Figure 2:
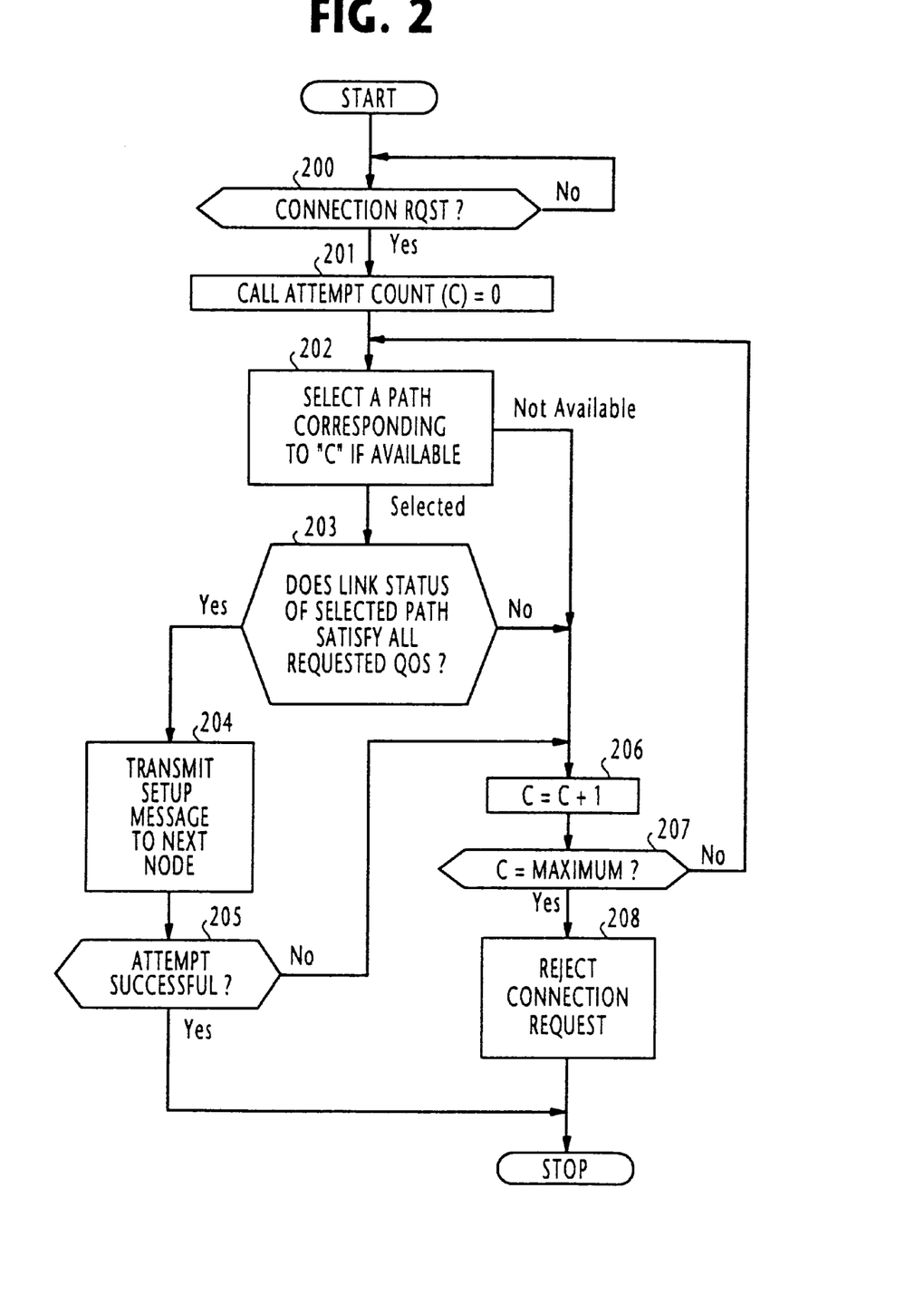
FIG. 2 is a flowchart of the operation of the QOS-based routing controller of FIG. 1.

Referring to the flowchart shown in FIG. 2, the operation of the QOS-based routing controller 104 will be described by assuming that user terminal 100 sends a connection request for establishing a connection to user terminal 107. The operation of controller 104 begins with step 200 in response to receipt of a connection request from source terminal 100 by setting a call attempt count (C) to zero (step 201). Flow enters a path finding routine 202 to select a path corresponding to the count C if such a path is available. As will be described in greater detail later, when an optimum path is selected, flow proceeds to decision step 203. If no paths are available for the call attempt count, flow proceeds from step 202 to step 206 to increment the count C by one.

At decision step 203, the controller 104 checks to see if the selected path satisfies all the QOS values specified in the connection request. If the decision is affirmative at step 203, flow proceeds to step 204 to transmit a setup message to the next node and determines, at step 205, whether or not the call attempt is successful. If successful, flow proceeds to the end of the program. Otherwise, flow proceeds to step 206 to increment the count C by one. At step 207, the incremented count value is checked against a maximum value. If the count C is smaller than the maximum value, flow returns to step 202 to perform reselection of a path. If the count value C is equal to the maximum value, flow proceeds to step 208 to reject the connection request and terminates the routing control.

Figure 3:
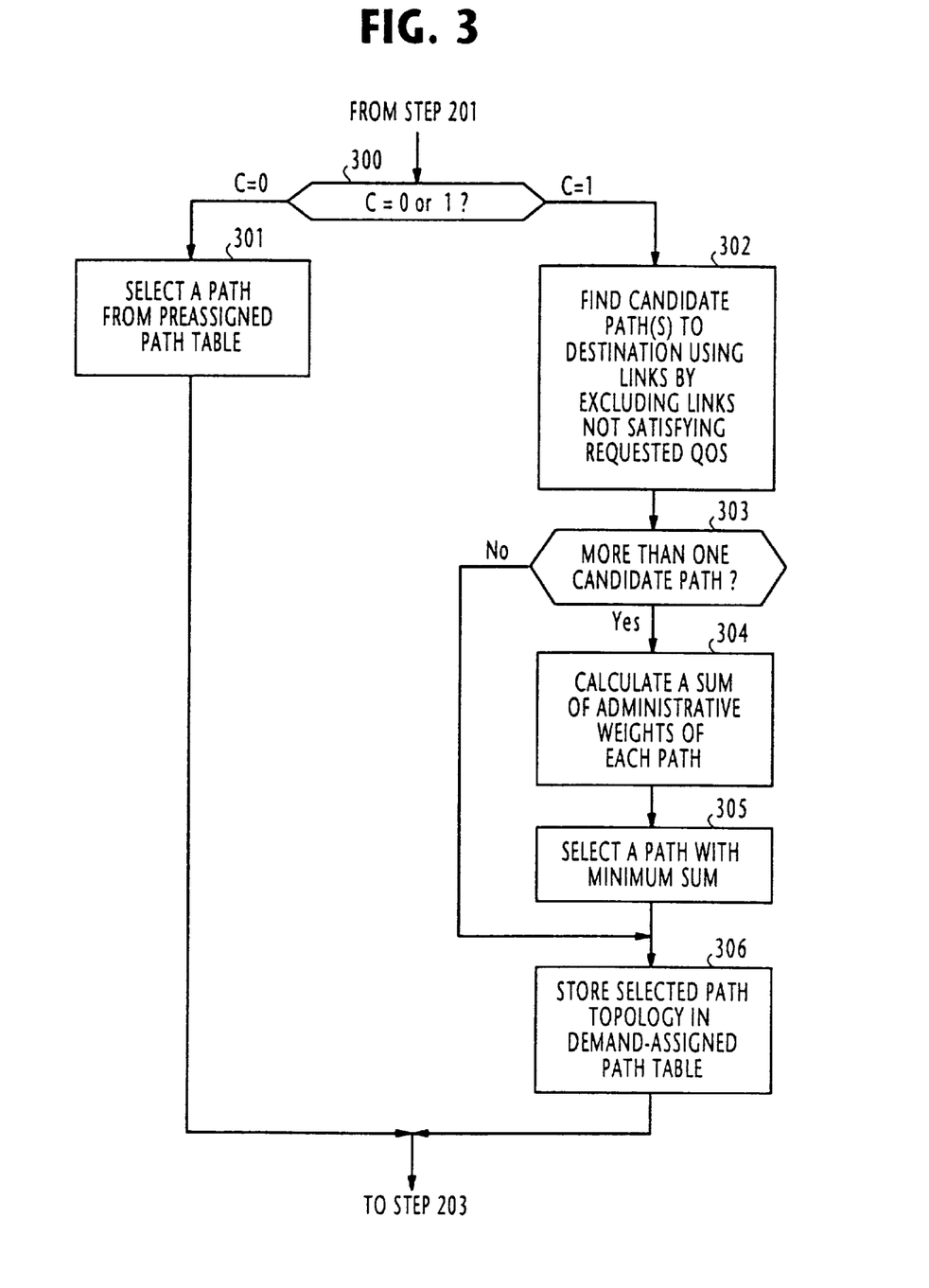
FIG. 3 is a flowchart of the path finding routine of FIG. 2 according to one embodiment of the present invention in which administrative weights are used for on-demand link cost calculation to select an optimum path.

In FIG. 3, a first embodiment of path finding routine 202 is shown. Routine 202 begins with step 300 where the controller 104 checks to see if the count C is equal to 0 or 1. If C=0, flow branches at step 300 to step 301 to select a path from the preassigned path table 105 and proceeds to step 203. If C=1, flow branches at step 300 to step 302 to find candidate paths to destination using links stored in the link state database 103 by excluding those not satisfying a specified QOS. Flow proceeds to step 303 to determine whether there is more than one candidate path. If so, flow proceeds to step 304 to calculate a sum of administrative weights of each candidate path. The controller 104 selects one of the candidate paths that gives the smallest of the sums (step 305), and flow proceeds to step 306 to store the topology of the selected path into the demand-assigned path table 106, and proceeds to step 203. If there is only one candidate path, flow proceeds from step 303 to step 306 to store the topology of the candidate path found at step 302 and proceeds to step 203.

Figure 4A:
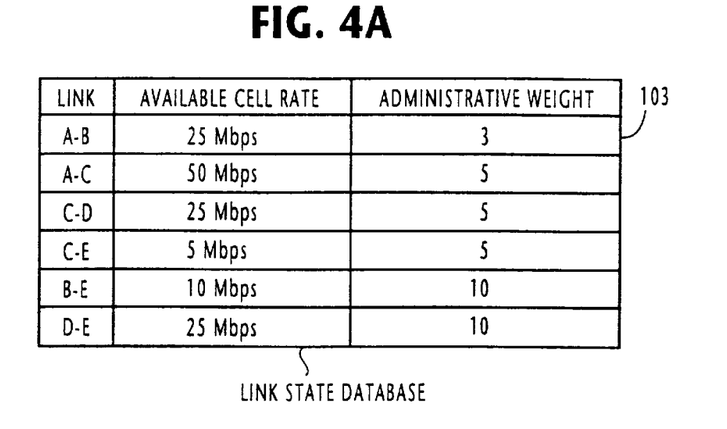
FIGS. 4A, 4B and 4C are respective illustrations of the link state database, a path topology stored in a preassigned path table, and a path topology stored in a demand-assigned path table useful for describing the operation of the path finding routine of FIG. 3.
Figure 4B:
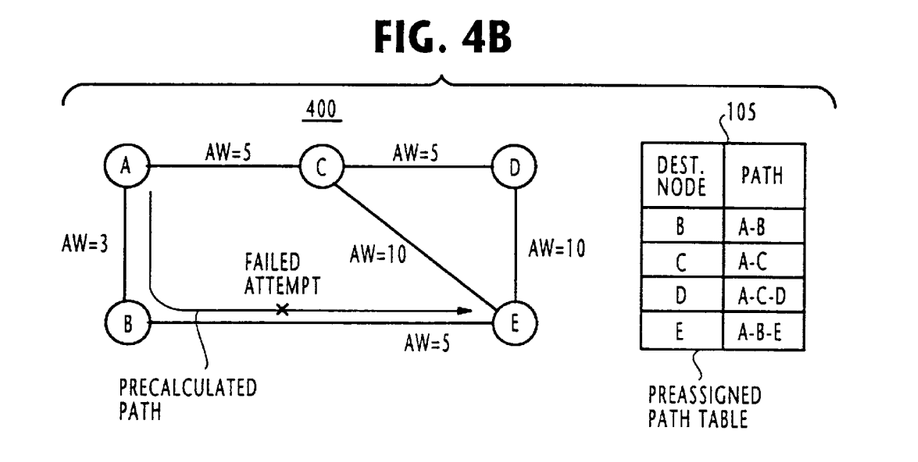

The operation of the path finding routine of FIG. 3 will be explained below with reference to FIGS. 4A, 4B and 4C by assuming that an ACR value of 20 Mbps is specified as a QOS parameter by the connection request from terminal 100 and link-associated ACR parameter values are mapped to corresponding administrative weights in the link state database 103 as shown in FIG. 4A. It is further assumed that a node link topology 400 is already derived from the link state database 103 using administrative weights and a link A-B-E is stored in the destination node entry E of the preassigned path table 105 (FIG. 4B).

Figure 4C:
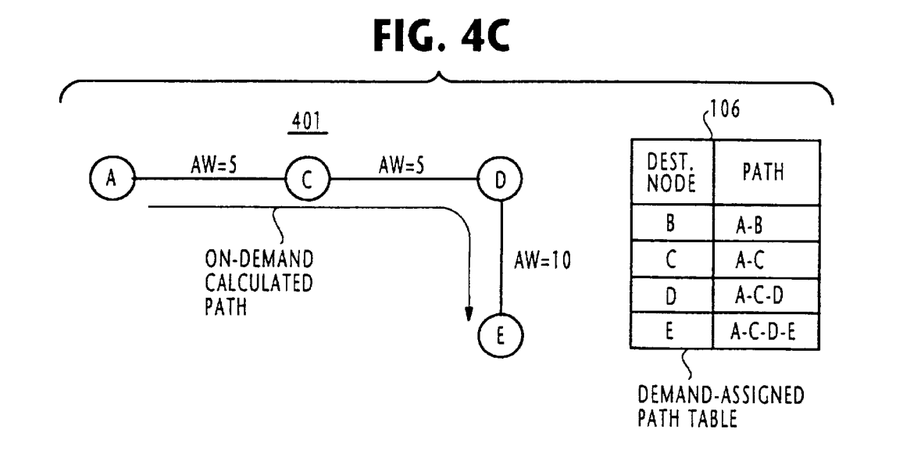

In response to the connection request, the routing controller 104 executes steps 200 and 201 (FIG. 2) and enters step 300 (FIG. 3). Since the count value C is initially zero it proceeds to step 301 to select the path A-B-E from the preassigned path table 105. At step 203 (FIG. 2), the controller 104 checks to see if the specified ACR value of 20 Mbps is satisfied with any of the links of the path A-B-E. Since the available cell rate of link B-E is 10 Mbps (FIG. 4A), it is determined that the specified QOS parameter value is not satisfied and the precalculated path A-B-E is abandoned and flow proceeds from step 203 to step 206 to increment the call attempt count C by one. Routing controller 104 returns to step 300 where it branches to step 302 to exclude link B-E as well as link C-E since the latter's ACR value is smaller than the requested value and find candidate paths from the remainder links. Therefore, links A-B, A-C, C-D and D-E are selected and a path A-C-D-E is selected as a candidate. Since there is only one candidate path (step 303), a topology 401 of the path A-C-D-E is stored into the demand-assigned path table 106 (FIG. 4C) and flow proceeds to step 203 to check to see if the selected path satisfies any of the other requested QOS parameters. Since no other QOS parameters than the ACR parameter are requested by the source terminal, flow proceeds from step 203 to step 204 to send a setup packet to node C, containing the topology data stored in the demand-assigned path table 106. If there is more than one candidate path (step 303), step 304 will be executed and a sum of administrative values of each candidate path is calculated for selecting one of these having a minimum sum.

Figure 5:
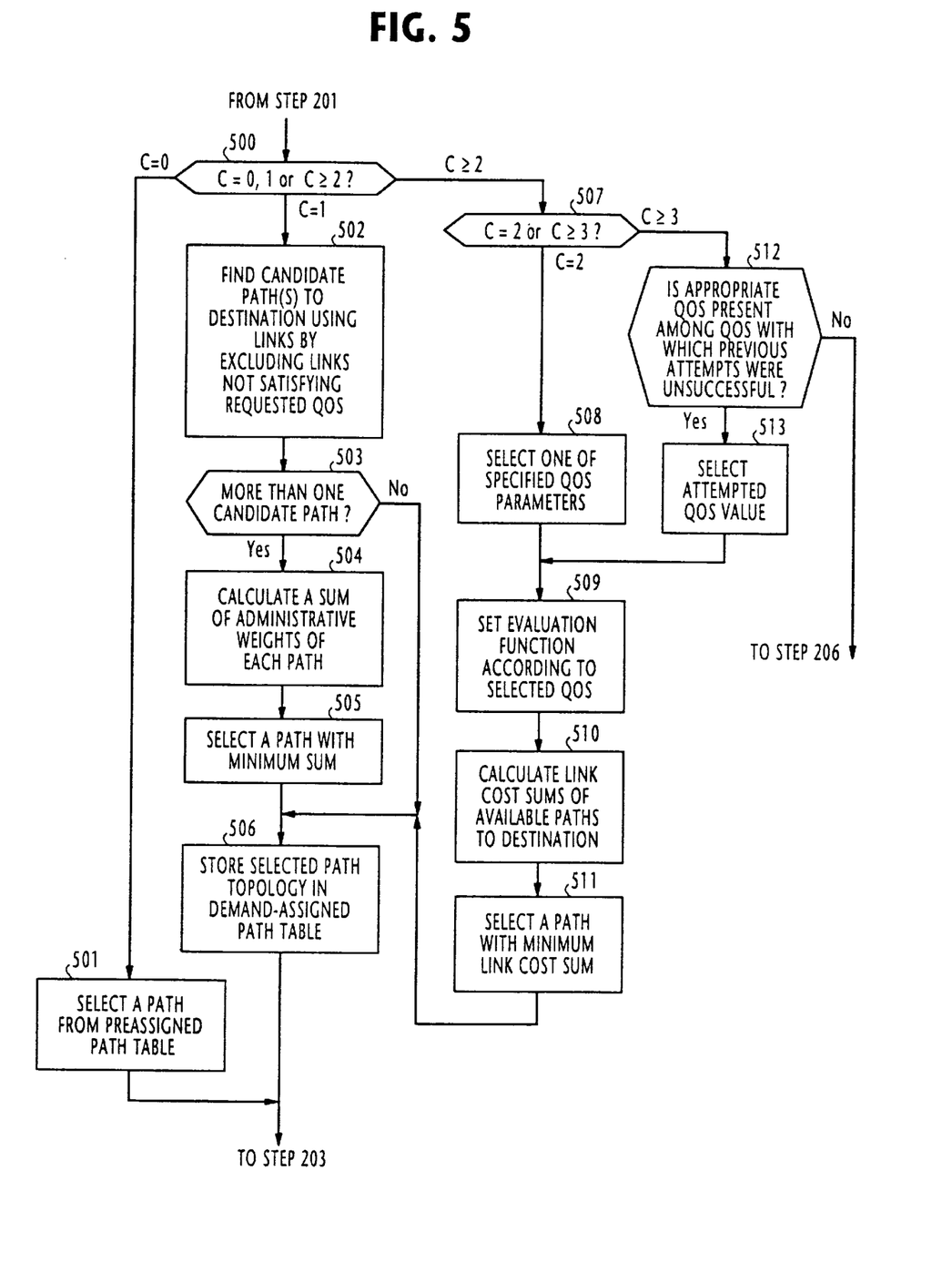
FIG. 5 is a flowchart of the path finding routine of FIG. 2 according to a second embodiment of the present invention in which administrative weights and cell transfer delay parameter are successively used for on-demand link cost calculation.

In FIG. 5, a second embodiment of path finding routine 202 is illustrated. Routine 202 begins with step 500 where the controller 104 checks to see if the count value C is equal to 0, 1 or equal to or greater than 2. If C=0, flow proceeds to step 501 to select a path from the preassigned path table 105 and proceeds to step 203. If C=1, flow proceeds to step 502 to find candidate paths to destination using links stored in the link state database 103 by excluding those not satisfying a specified QOS. Flow proceeds to step 503 to determine whether there is more than one candidate path. If so, flow proceeds to step 504 to calculate a sum of administrative weights of each candidate path. The controller 104 selects one of the candidate paths that gives the smallest of the sums (step 505), and flow proceeds to step 506 to store the topology of the selected path into the demand-assigned path table 106, and proceeds to step 203. If there is only one candidate path, flow proceeds from step 503 to step 506 to store the topology of the candidate path found at step 502 and proceeds to step 203.

If C is equal to or greater than 2, flow proceeds to step 507 to determine if C is equal to or greater than 2. If C=2, flow proceeds from step 507 to step 508 to select one of the QOS parameters specified in a connection request, and at step 509, the selected QOS parameter is set into the following evaluation function (link cost formula):

$$\text{Link cost} = c_1 \cdot 1/\text{ACR} + c_2 \cdot \text{CTD} + C_3 \cdot \text{CLR} + c_4 \cdot \text{CDV}$$

where $c_1$, $c_2$, $c_3$ and $c_4$ are coefficients determined by the selected QOS parameter. Therefore, if the ACR (available cell rate) parameter is chosen at step 508, $c_1=1$ and $c_2=c_3=c_4=0$ are set in the link cost formula. At step 510, the selected QOS parameter is used as a link cost and link cost sums of available paths to destination are determined. At step 511, a path with a minimum link cost sum is selected and the topology of the selected path is stored in the demand assigned path table 106 (step 506).

If C is equal to or greater than 3, flow proceeds from step 507 to step 512 to determine whether there is at least one appropriate QOS parameter among the QOS parameters with which previous call attempts were unsuccessful. If the decision is negative, flow proceeds from step 512 to step 206 to increment the call attempt count C. If the decision is affirmative, flow proceeds from step 512 to step 513 to select the appropriate QOS parameter and proceeds to step 509 to set the selected QOS parameter in the link cost formula.

Figure 6A:
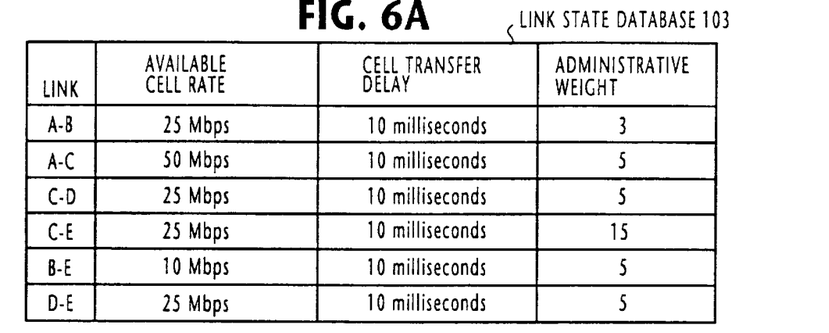
FIGS. 6A, 6B, 6C and 6D arc respective illustrations of the link state database, a path topology stored in the preassigned path table, a path topology stored in the demand-assigned path table when a call attempt is unsuccessful and a path topology stored in the demand-assigned path table when a call attempt is successful, these illustrations being useful for describing the operation of the path finding routine of FIG. 5.
Figure 6B:
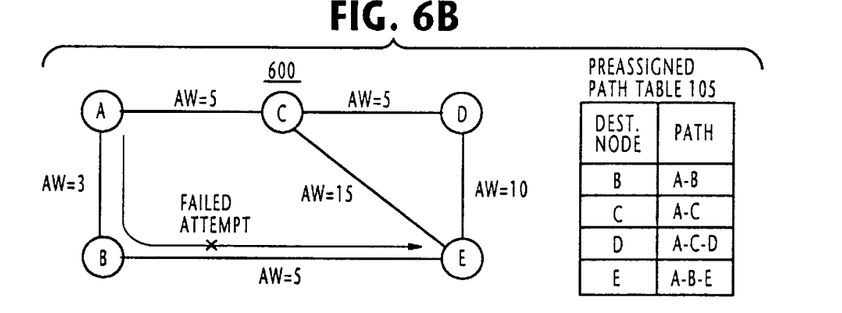

The operation of the path finding routine of FIG. 5 will be described with reference to FIGS. 6A, 6B, 6C and 6D by assuming that an ACR (available cell rate) value of 20 Mbps and a CTD (cell transfer delay) value of 25 ms are specified as user-requested QOS parameters and link-associated ACR and CTD values are mapped to corresponding administrative weights in the link state database 103 as shown in FIG. 6A It is further assumed that a node link topology 600 is already derived from the link state database 103 using administrative weights and the link A-B-E is stored in the destination node entry E of the preassigned path table 105 (FIG. 6B).

When the count value C is initially zero, flow proceeds from step 500 to 501 to select the path A-B-E from the preassigned path table 105. Since the ACR value of link B-E is 10 Mbps (FIG. 6A), it is determined at subsequent step 203 that the specified ACR value is not satisfied and the precalculated path A-B-E is abandoned and flow proceeds from step 203 to step 206 to increment the call attempt count C by one.

Figure 6C:
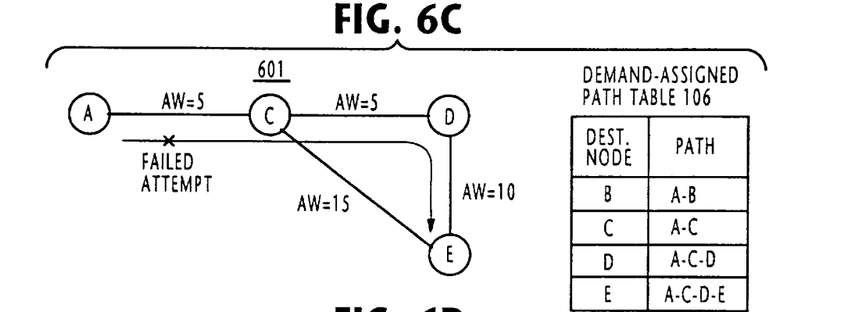

Routing controller 104 returns to step 500 where it branches to step 502 to exclude link B-E and find candidate paths from the remainder links. Therefore, links A-B, A-C, C-D, C-E and D-E are selected and a path A-C-D-E is selected as a candidate. Since there is only one candidate path, a topology 601 (FIG. 6C) is stored into the demand-assigned path table 106 and flow proceeds to step 203 to check to see if the selected path satisfies the other requested QOS value, i.e., the CTD value. Since the total CTD value of the selected path A-C-D-E is 30 ms, it is determined at step 203 that the selected candidate path A-C-D-E does not satisfy the requested CTD value of 25 ms.

Figure 6D:
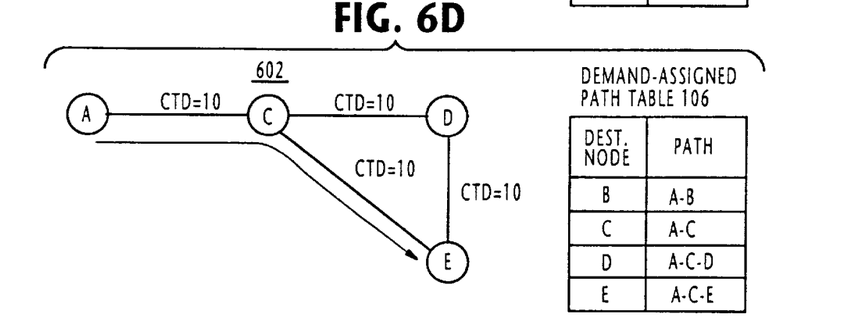

Thus, flow proceed to step 206 to increment the call attempt count C by one, and returns to step 500 again where it proceeds to step 507. If C=2, controller 104 proceeds from step 507 to step 508 to select one of the specified QOS parameters, for example, the CTD parameter, and the selected CTD parameter is set into the evaluation function (link cost formula) at step 509. As a result, $c_2=1$ and $c_1=c_3=c_4=0$ are set in the link cost formula. At step 510, controller 104 calculates link cost sums of all available paths to destination and selects a path A-C-E having a minimum CTD link cost sum (step 511). A path topology 602 (FIG. 6D) is then stored into the demand-assigned path table 106 for the selected path A-C-E (step 506) and flow proceeds to step 203 to check to see if the selected path satisfies the other requested QOS parameter value, i.e. the ACR value. Since all the links of the selected path A-C-E satisfy the requested ACR value of 20 Mbps, flow proceeds from step 203 to step 204 to transmit a setup message to node C, containing the topology data stored in the demand-assigned path table 106.

Figure 7:
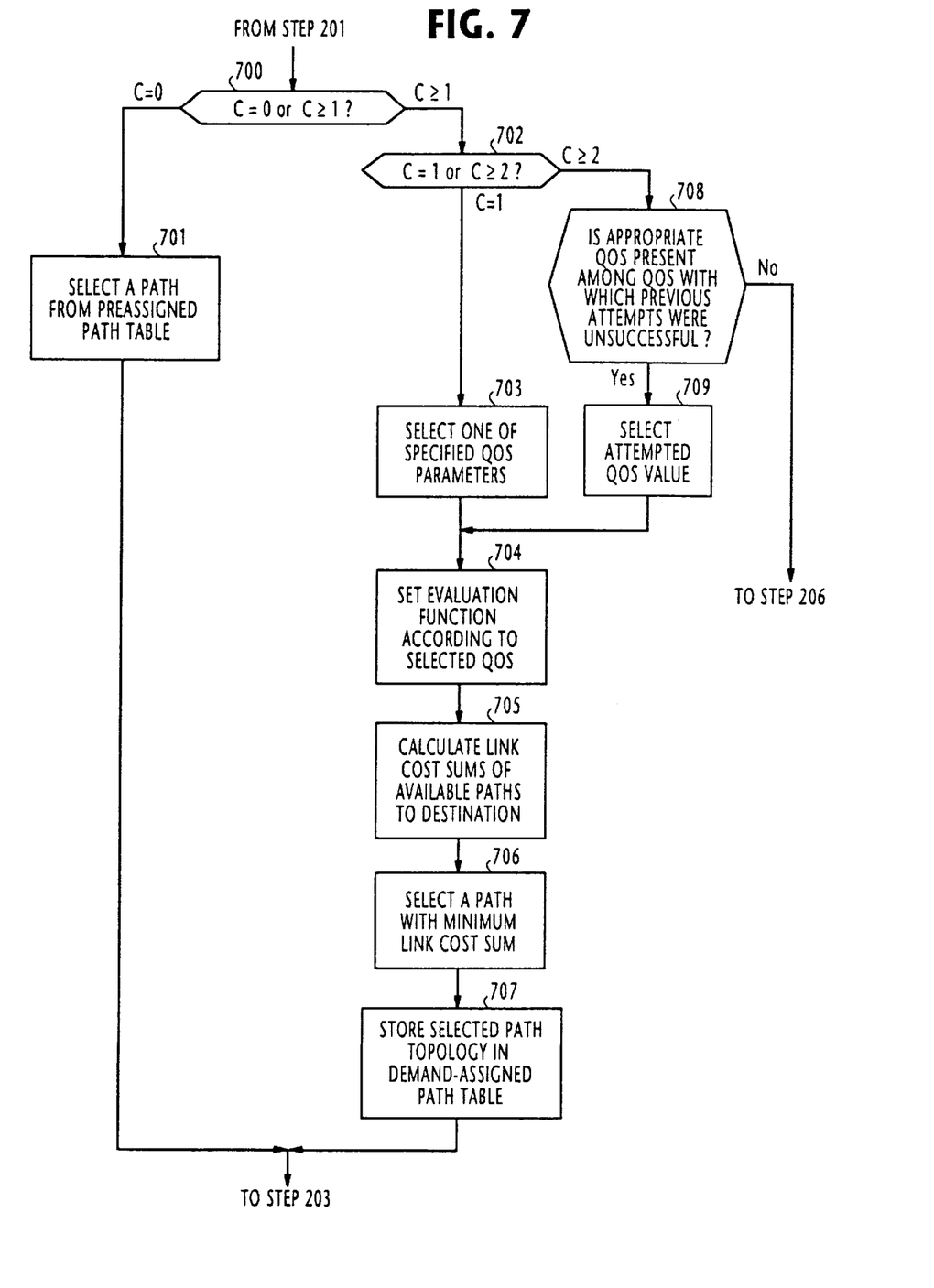
FIG. 7 is a flowchart of the path finding routine of FIG. 2 according to a third embodiment of the present invention in which available cell rate parameter and cell transfer delay parameter are used for on-demand link cost calculation.

In FIG. 7, a third embodiment of path finding routine 202 is illustrated as a simplified version of FIG. 5. Routine 202 begins with step 700 where the controller 104 checks to see if the count value C is equal to 0 or equal to or greater than 1. If C=0, flow proceeds to step 701 to select a path from the preassigned path table 105 and proceeds to step 203. If C≧1, flow proceeds from step 700 to step 702 to determine whether C=1 or C≧2. If C=1, flow proceeds from step 702 to step 703 to select one of the QOS parameters specified in the connection request, and at step 704, the selected QOS parameter is set into the link cost formula. At step 705, the selected QOS parameter is used to determine link cost sums of available paths to destination arc determined. At step 706, a path with a minimum link cost sum is selected and the topology of the selected path is stored in the demand assigned path table 106 (step 707), and flow proceeds to step 203.

If C≧2, flow proceeds from step 702 to step 708 to determine whether there is at least one appropriate QOS parameter among the QOS parameters with which previous call attempts were unsuccessful. If the decision is negative, flow proceeds from step 708 to step 206 to increment the call attempt count C. If the decision is affirmative, flow proceeds from step 708 to step 709 to select the appropriate QOS parameter and proceeds to step 704 to set the selected QOS parameter into the link cost formula.

Figure 8A:
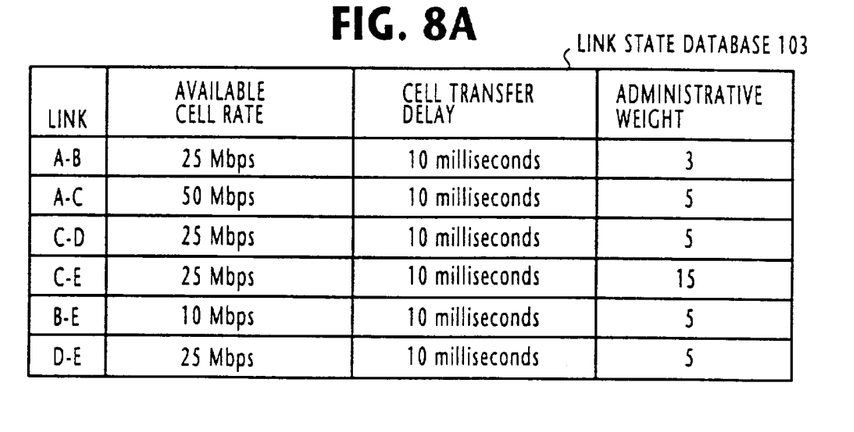
FIGS. 8A, 8B and 8C are respective illustrations of the link state database, a path topology stored in the preassigned path table, and a path topology stored in the demand-assigned path table useful for describing the operation of the path finding routine of FIG. 7.
Figure 8B:
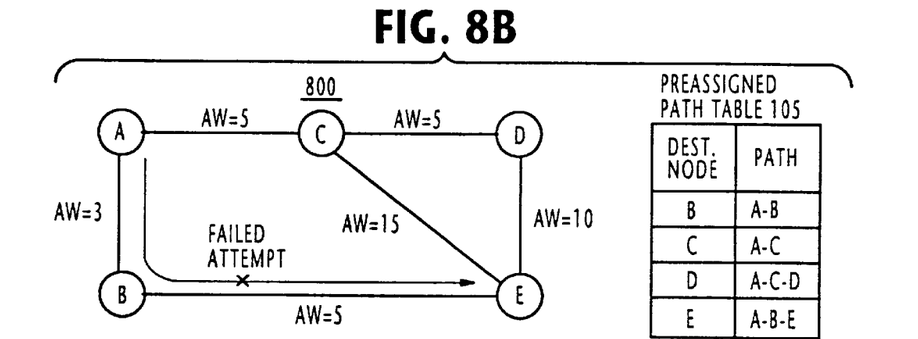

The operation of the path finding routine of FIG. 7 will be described with reference to FIGS. 8A, 8B and 8C by assuming that the same ACR value of b 20Mbps and CTD value of 25 ms are specified as in the previous example and that the contents of the link state database 103 are the same as FIG. 6A and repeated here in FIG. 8A. It is further assumed that a node link topology 800 (identical to topology 600 of FIG. 6B) is already derived from the link state database 103 is stored in the destination node entry E of the preassigned path table 105 (FIG. 8B).

When the count value C is initially zero, flow proceeds from step 700 to 701 to select the path A-B-E from the preassigned path table 105. Since the ACR value of link B-E is 10 Mbps (FIG. 8A), it is determined at subsequent step 203 that the request ACR value is not satisfied and the precalculated path A-B-E is abandoned and flow proceeds from step 203 to step 206 to increment the call attempt count C by one.

Figure 8C:
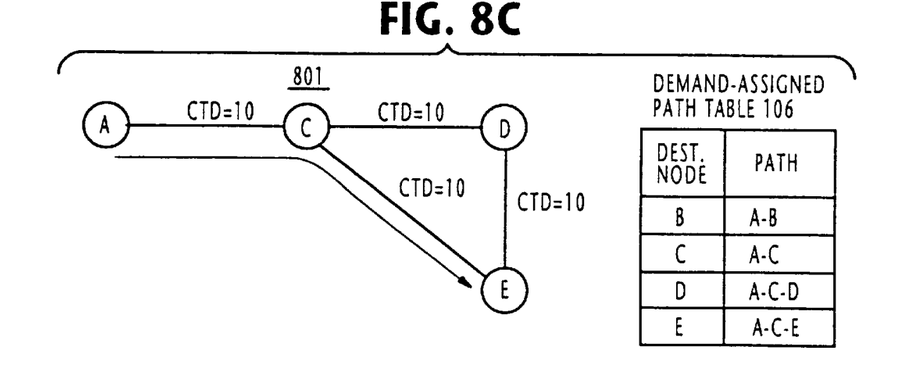

Routing controller 104 returns to step 700 where it branches to step 702. If C=1, controller 104 proceeds from step 702 to step 703 to select one of the specified QOS parameters, for example, the CTD parameter, and the selected CTD parameter is set into the link cost formula at step 704. At step 705, controller 104 calculates link cost sums of all available paths to destination and selects a path A-C-E having a minimum CTD link cost sum (step 706). A path topology 801 (FIG. 8C) is then stored into the demand-assigned path table 106 for the selected path A-C-E (step 707) and flow proceeds to step 203 to check to see if the selected path satisfies the other requested QOS parameter value, i.e. the ACR value. Since all the links of the selected path A-C-E satisfy the requested ACR value of 20 Mbps, flow proceeds from step 203 to step 204 to transmit a setup message to node C, containing the topology data stored in the demand-assigned path table 106.

Figure 9:
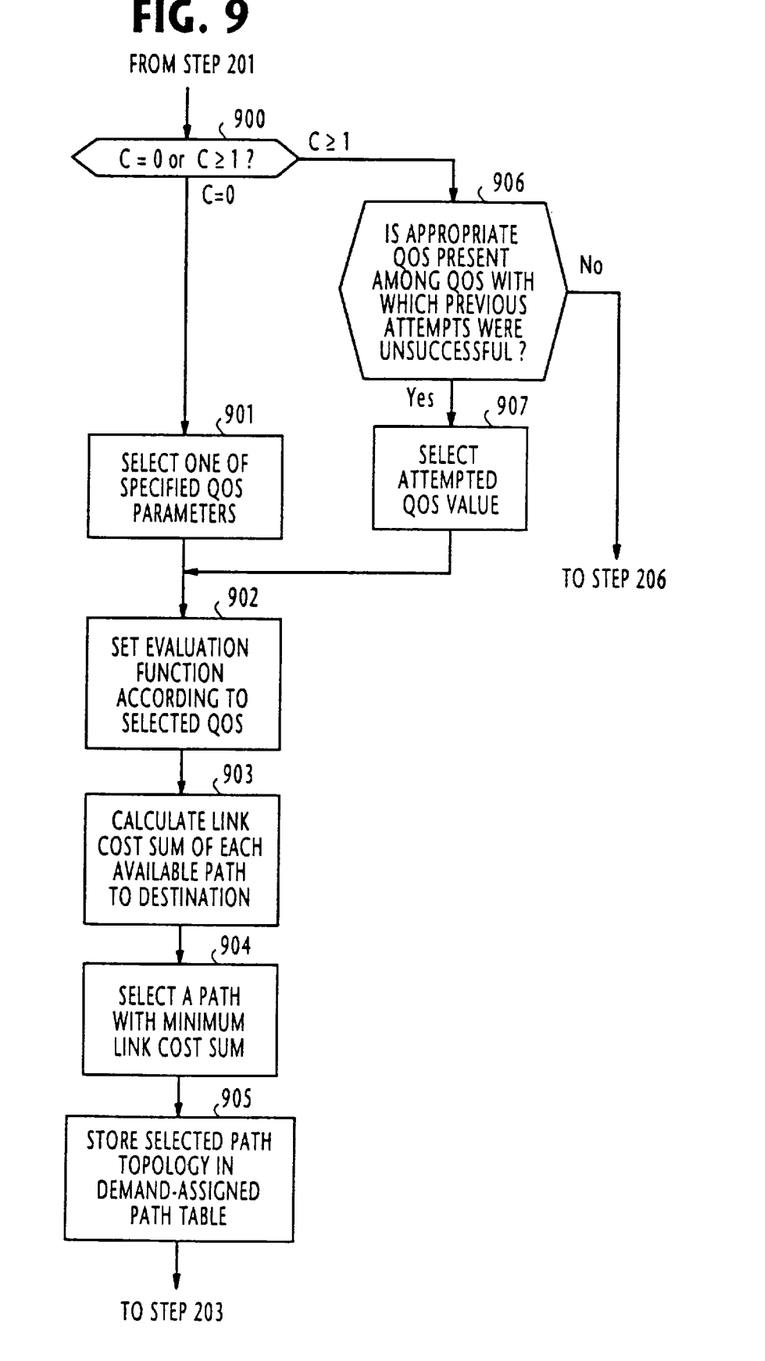
FIG. 9 is a flowchart of the path finding routine of FIG. 2 according to a fourth embodiment of the present invention in which available cell rate parameter and cell transfer delay parameter are used for on-demand link cost calculation and the preassigned path table is not used for path selection.

As a simple and yet effective path finding approach, the path finding routine 202 of FIG. 5 is further simplified as shown in FIG. 9.

In FIG. 9, routine 202 begins with step 900 where the controller 104 checks to see if the count value C is equal to 0 or equal to or greater than 1. If C=0, flow proceeds to step 901 to select one of the QOS parameters specified in the connection request, and at step 902, the selected QOS parameter is set into the link cost formula and the selected QOS parameter is used to determine link cost sums of available paths to destination are determined (step 903). At step 904, a path with a minimum link cost sum is selected and the topology of the selected path is stored in the demand assigned path table 106 (step 905), and flow proceeds to step 203.

If C≧1, flow proceeds from step 900 to step 906 to determine whether there is at least one appropriate QOS parameter among the QOS parameters with which previous call attempts were unsuccessful. If the decision is negative, flow proceeds from step 906 to step 206 to increment the call attempt count C. If the decision is affirmative, flow proceeds from step 906 to step 907 to select the appropriate QOS parameter and proceeds to step 902 to set the selected QOS parameter into the link cost formula.

Figure 10A:
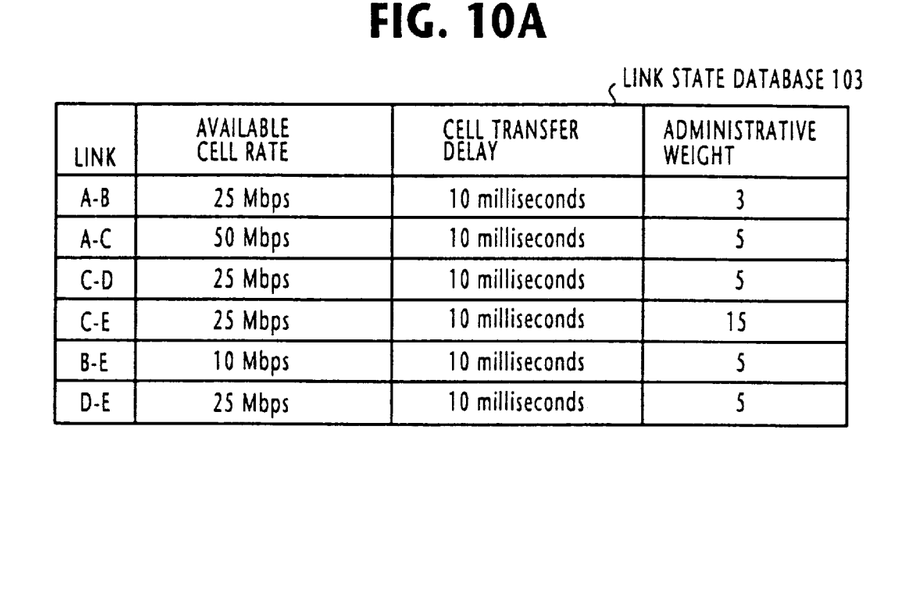
FIGS. 10A and 10B are respective illustrations of the link state database and a path topology stored in the demand-assigned path table useful for describing the operation of the path finding routine of FIG. 9.

The operation of the path finding routine of FIG. 9 will be described with reference to FIGS. 10A and 10B by assuming that the same ACR value of 20 Mbps and CTD value of 25 ms are specified as in the previous examples and that the contents of the link state database 103 are the same as FIG. 6A and repeated here in FIG. 10A.

Figure 10B:
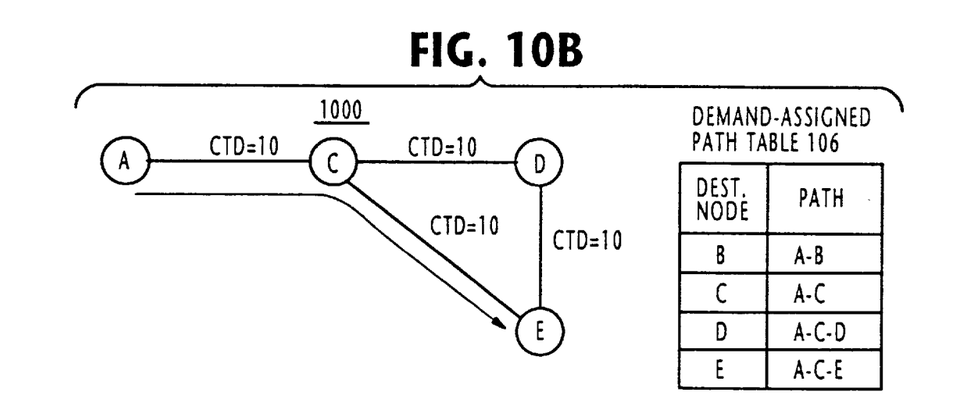

When the count value C is initially zero, flow proceeds from step 900 to step 901 to select one of the specified QOS parameters, for example, the CTD parameter, and the selected CTD parameter is set into the link cost formula at step 902. At step 903, controller 104 calculates link cost sums of all available paths to destination and selects a path A-C-E having a minimum CTD link cost sum (step 904). A path topology 1000 (FIG. 10B) is then stored into the demand-assigned path table 106 for the selected path A-C-E (step 905) and flow proceeds to step 203 to check to see if the selected path satisfies the other requested QOS parameter value, i.e. the ACR value. Since all links of the selected path satisfy the requested ACR value of 20 Mbps, a setup message is sent from node A to node C, containing the topology data stored in the demand-assigned path table 106 (step 204).

What is claimed is:

1. A routing apparatus for a connection-oriented network comprising a plurality of nodes interconnected by communication links, the routing apparatus comprising:

a database for storing periodically updated link status information of the network indicating resource constraints of the links; and control means, responsive to a connection request specifying a plurality of QOS (quality of service) parameters, for performing the functions of:

selecting a first path to a destination;

transmitting a first signaling message containing routing data of the first path toward the destination if resource constraints of the first path satisfy all the specified QOS parameters;

selecting one of the specified OOS parameters;

determining a plurality of candidate paths to the destination using resource constraints of the database corresponding to the selected QOS parameter;

selecting an optimum one of the candidate paths as a second path if the transmission of the first signaling message is unsuccessful or the resource constraints of the first path do not satisfy all the specified QOS parameters; and transmitting a second signaling message containing routing data of the second path toward the destination if resource constraints of the second path satisfy all other specified OOS parameters.

2. A method for routing a call through a connection-oriented network comprising a plurality of nodes interconnected by communication links, the method comprising the steps of:

a) storing link status information of the network and periodically updating the stored information according to link status of the network, the link status information indicating resource constraints of the links;

b) responsive to a connection request specifying a plurality of QOS (quality of service) parameters, selecting a first path to a destination;

c) transmitting a first signaling message toward the destination containing routing data of the first path if resource constraints of the first path satisfy all the specified QOS parameters;

d) selecting one of the specified OOS parameters;

determining a plurality of candidate paths to the destination using resource constraints of the database corresponding to the selected QOS parameter;

selecting an optimum one of said candidate paths as a second path if the resource constraints of the first path do not satisfy all the specified QOS parameters or the transmission of the first signaling message is unsuccessful; and e) transmitting a second signaling message containing routing data of the second path toward the destination if resource constraints of the second path satisfy all other specified OOS parameters.

3. A method as claimed in claim 2, wherein said first path of the step (b) is a predetermined path.

4. A method as claimed in claim 2 or 3, wherein the step (d) further comprises the steps of:

calculating a sum of weights respectively assigned to the links of each of the candidate paths; and selecting, as the second path, one of the candidate paths having a minimum sum.

5. A method as claimed in claim 2 or 3, wherein the step (d) further comprises the steps of:

selecting, as a link cost, one of the QOS parameters;

calculating a sum of the link costs for each of the candidate paths to said destination; and selecting, as the second path, one of the candidate paths having a minimum link cost sum.

6. A method as claimed in claim 5, wherein the step (d) further comprises the steps of:

selecting, as the link cost, one of the QOS parameters with each of which the transmission of a signaling message was previously unsuccessful.

7. A method as claimed in claim 2, wherein the step (b) further comprises the steps of:

finding a plurality of candidate paths to said destination;

calculating a sum of weights respectively assigned to the links of each of the candidate paths; and selecting, as the first path, one of the candidate paths having a minimum sum.

8. A method as claimed in claim 2, wherein the step (b) further comprises the steps of:

selecting one of the QOS parameters as a link cost;

calculating a sum of the link costs for each one of a plurality of candidate paths to said destination; and selecting, as the first path, one of the candidate paths having a minimum link cost sum.

9. A method for routing a call through a connection-oriented network comprising a plurality of nodes interconnected by communication links, comprising the steps of:

a) storing link status information of the network and periodically updating the stored information according to link status of the network, said link status information indicating resource constraints of the links;

b) responsive to a connection request specifying a plurality of QOS (quality of service) parameters, resetting a count value;

c) selecting a path to a destination according to said count value, one of the specified QOS parameters and contents of the stored information corresponding to said one of the QOS parameters;

d) transmitting a signaling message containing routing data of the path toward the destination if resource constraints of the path satisfy all the specified QOS parameters;

e) incrementing the count value if the resource constraints of the path do not satisfy all the QOS parameters or if the transmission of the signaling message is unsuccessful; and f) repeating steps (c) to (e) a predetermined number of times.

10. A method as claimed in claim 9, wherein the step (c) further comprises the steps of:

finding a plurality of candidate paths to said destination;

calculating a sum of weights respectively assigned to the links of each of the candidate paths; and selecting one of the candidate paths having a minimum sum.

11. A method as claimed in claim 9 or 10, wherein the step (c) further comprises the steps of:

selecting one of the QOS parameters as a link cost;

calculating a sum of the link costs for each one of a plurality of candidate paths to said destination; and selecting one of the candidate paths having a minimum link cost sum.

12. A method as claimed in claim 9 or 10, wherein the step (c) further comprises the steps of:

selecting, as a link cost, one of the QOS parameters with each of which the transmission of a transmitter signaling message was previously unsuccessful;

calculating a sum of the link costs for each one of a plurality of candidate paths to said destination; and selecting one of the candidate paths having a minimum link cost sum.

13. A method as claimed in claim 9, wherein the step (c) further comprises the steps of:

when the count value is 0, selecting a predetermined path;

when the count value is incremented to 1, finding a plurality of candidate paths to said destination;

calculating a sum of weights respectively assigned to the links of each of the candidate paths; and selecting one of the candidate paths having a minimum sum.

14. A method as claimed in claim 9, wherein the step (c) further comprises the steps of:

when the count value is 0, selecting a predetermined path;

when the count value is incremented to 1, selecting one of the QOS parameters as a link cost;

calculating a sum of the link costs for each one of a plurality of candidate paths to said destination; and selecting one of the candidate paths having a minimum link cost sum.

15. A method as claimed in claim 9, wherein the step (c) further comprises the steps of:

when the count value is 0, selecting a predetermined path;

when the count value is incremented to 1, finding a plurality of candidate paths to said destination;

calculating a sum of weights respectively assigned to the links of each of the candidate paths;

selecting one of the candidate paths having a minimum sum;

when the count value is incremented to 2, selecting one of the QOS parameters as a link cost;

calculating a sum of the link costs for each one of a plurality of candidate paths to said destination; and selecting one of the candidate paths having a minimum link cost sum.

16. A method as claimed in claim 15, wherein the step (c) further comprises the steps of:

when the count value is incremented to 3, selecting, as the link cost, one of the QOS parameters with each of which the transmission of a signaling message was previously unsuccessful.

\* \* \* \* \*